(12) United States Patent
Nguyen et al.

(10) Patent No.: US 10,311,054 B2
(45) Date of Patent: Jun. 4, 2019

(54) QUERY DATA SPLITTING

(71) Applicant: Red Hat, Inc., Raleigh, NC (US)

(72) Inventors: Filip Nguyen, Brno (CZ); Filip Eliáš, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 342 days.

(21) Appl. No.: 14/150,333

(22) Filed: Jan. 8, 2014

(65) Prior Publication Data
US 2015/0193541 A1 Jul. 9, 2015

(51) Int. Cl.
*G06F 17/30* (2006.01)
*G06F 16/2453* (2019.01)
*G06F 17/00* (2019.01)

(52) U.S. Cl.
CPC .. *G06F 16/24539* (2019.01); *G06F 17/30457* (2013.01); *G06F 17/30545* (2013.01)

(58) Field of Classification Search
None
See application file for complete search history.

(56) References Cited

U.S. PATENT DOCUMENTS

| | | | |
|---|---|---|---|
| 5,668,987 A * | 9/1997 | Schneider | G06F 12/0802 |
| 6,341,281 B1 * | 1/2002 | MacNicol | G06F 17/30451 |
| 6,438,537 B1 * | 8/2002 | Netz | G06F 17/30592 |
| 6,519,592 B1 * | 2/2003 | Getchius | G06F 17/3048 |
| 6,598,044 B1 * | 7/2003 | Waas | G06F 17/30463 |
| 6,701,309 B1 * | 3/2004 | Beeferman | G06F 17/30646 |
| 6,763,357 B1 * | 7/2004 | Deshpande | G06F 17/30457 |
| 7,058,622 B1 * | 6/2006 | Tedesco | G06F 17/30595 |
| 7,499,940 B1 * | 3/2009 | Gibbs | G06F 17/30887 |
| 8,108,394 B2 | 1/2012 | Johnson et al. | |
| 8,214,325 B2 | 7/2012 | Navas | |
| 8,285,711 B2 | 10/2012 | Bordawekar et al. | |
| 8,359,326 B1 * | 1/2013 | Garg | G06F 17/30864 707/705 |
| 8,364,697 B2 | 1/2013 | Matias et al. | |
| 8,738,587 B1 * | 5/2014 | Bitincka | G06F 17/30477 707/608 |
| 9,135,307 B1 * | 9/2015 | Panda | G06F 17/3053 |
| 2002/0107835 A1 * | 8/2002 | Coram | G06F 17/30457 |
| 2003/0018468 A1 * | 1/2003 | Johnson | G06F 17/30864 704/8 |

(Continued)

OTHER PUBLICATIONS

"Federated Data Management and Query Optimization for Linked Open Data" http://userpages.uni-koblenz.de/~staab/Research/Publications/2010/LOD-Federation.pdf, 2011.

(Continued)

*Primary Examiner* — Polina G Peach
(74) *Attorney, Agent, or Firm* — Womble Bond Dickinson (US) LLP; Daniel E. Ovanezian

(57) ABSTRACT

Implementations for query data splitting are disclosed. In one example, the method includes receiving, by a processing device, a first query and a second query, determining that the second query is a subset of the first query, determining a first set of attributes associated with the first query and a second set of attributes associated with the second query, and determining, by the processing device, whether to submit the second query or the first query to a database in view of the first set of attributes and the second set of attributes.

16 Claims, 4 Drawing Sheets

(56) References Cited

U.S. PATENT DOCUMENTS

| | | | |
|---|---|---|---|
| 2003/0158842 A1* | 8/2003 | Levy | G06F 17/30445 |
| 2004/0133538 A1* | 7/2004 | Amiri | G06F 17/30457 |
| 2004/0249683 A1* | 12/2004 | Demarcken | G06F 17/30457 |
| | | | 705/5 |
| 2005/0138073 A1* | 6/2005 | Zhou | G06F 17/30595 |
| 2006/0004850 A1* | 1/2006 | Chowdhury | G06F 17/30864 |
| 2006/0053164 A1* | 3/2006 | Ewing | G06F 17/30306 |
| 2006/0064411 A1* | 3/2006 | Gross | G06F 17/30864 |
| 2006/0206454 A1* | 9/2006 | Forstall | G06F 17/30864 |
| 2007/0208733 A1* | 9/2007 | Brault | G06F 17/30395 |
| 2008/0071740 A1* | 3/2008 | Jhala | G06F 17/3064 |
| 2008/0098173 A1* | 4/2008 | Chidambaran | G06F 17/3048 |
| | | | 711/118 |
| 2008/0172354 A1* | 7/2008 | Zuzarte | G06F 17/30469 |
| 2008/0201293 A1* | 8/2008 | Grosset | G06F 17/30592 |
| 2009/0070323 A1* | 3/2009 | Parikh | G06F 17/30693 |
| 2010/0010989 A1* | 1/2010 | Li | G06F 17/30675 |
| | | | 707/E17.017 |
| 2010/0036805 A1* | 2/2010 | Blamer | G06F 17/30457 |
| | | | 711/118 |
| 2010/0115100 A1 | 5/2010 | Tubman et al. | |
| 2010/0191856 A1* | 7/2010 | Gupta | H04L 61/1511 |
| | | | 709/228 |
| 2011/0072006 A1* | 3/2011 | Yu | G06F 17/30451 |
| | | | 707/718 |
| 2011/0106966 A1* | 5/2011 | Smit | G06F 17/2288 |
| | | | 709/231 |
| 2011/0208808 A1* | 8/2011 | Corbett | G06F 17/30442 |
| | | | 709/203 |
| 2011/0258212 A1* | 10/2011 | Lu | G06F 17/30864 |
| | | | 707/760 |
| 2011/0313969 A1 | 12/2011 | Ramu | |
| 2012/0047135 A1* | 2/2012 | Hansson | G06F 17/3064 |
| | | | 707/731 |
| 2012/0059810 A1* | 3/2012 | Sejnoha | G06F 17/30976 |
| | | | 707/706 |
| 2012/0066195 A1* | 3/2012 | Lee | G06F 17/3064 |
| | | | 707/706 |
| 2012/0233176 A1* | 9/2012 | Korn | G06F 21/6227 |
| | | | 707/747 |
| 2013/0091170 A1 | 4/2013 | Zhang et al. | |
| 2014/0095472 A1* | 4/2014 | Lee | G06F 17/30463 |
| | | | 707/714 |
| 2014/0164362 A1* | 6/2014 | Syed | G06F 17/30994 |
| | | | 707/722 |
| 2014/0279995 A1* | 9/2014 | Wang | G06F 17/30663 |
| | | | 707/706 |

OTHER PUBLICATIONS

Wu, G., & Yang, M. D. (2012). Improving SPARQL query performance with algebraic expression tree based caching and entity caching. Journal of Zhejiang University science c, 13(4), 281-294.

Devadithya, T. (2008). A graph based cache system for efficient querying in distributed triplestores. ProQuest. Abstract only.

* cited by examiner

QUERY DATA SPLITTING

TECHNICAL FIELD

The present disclosure relates to databases, and more specifically to determining a specific query to send to a database.

BACKGROUND

Databases are widely used in various types of business and applications. In recent years, the number of data objects that can be and are stored in a database has increased exponentially, which causes a problem when performing federated data searches on the data objects in the database because it consumes too much time and resources to perform the search.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Methods and systems for providing query data splitting are described.

In a federated data environment in which data from disparate sources is aggregated into a virtual database, processing a large number of small queries results in inefficient use of resources and slow performance. The present disclosure includes a method and system for optimization for data federation. In one example, the method detects queries that will return similar data (i.e., the method detects whether one query is a generalized version of another). The method also analyzes statistics from query executions. Based on the analysis, the results of general queries can be exploited to the benefit of the less general queries.

Figure 1:
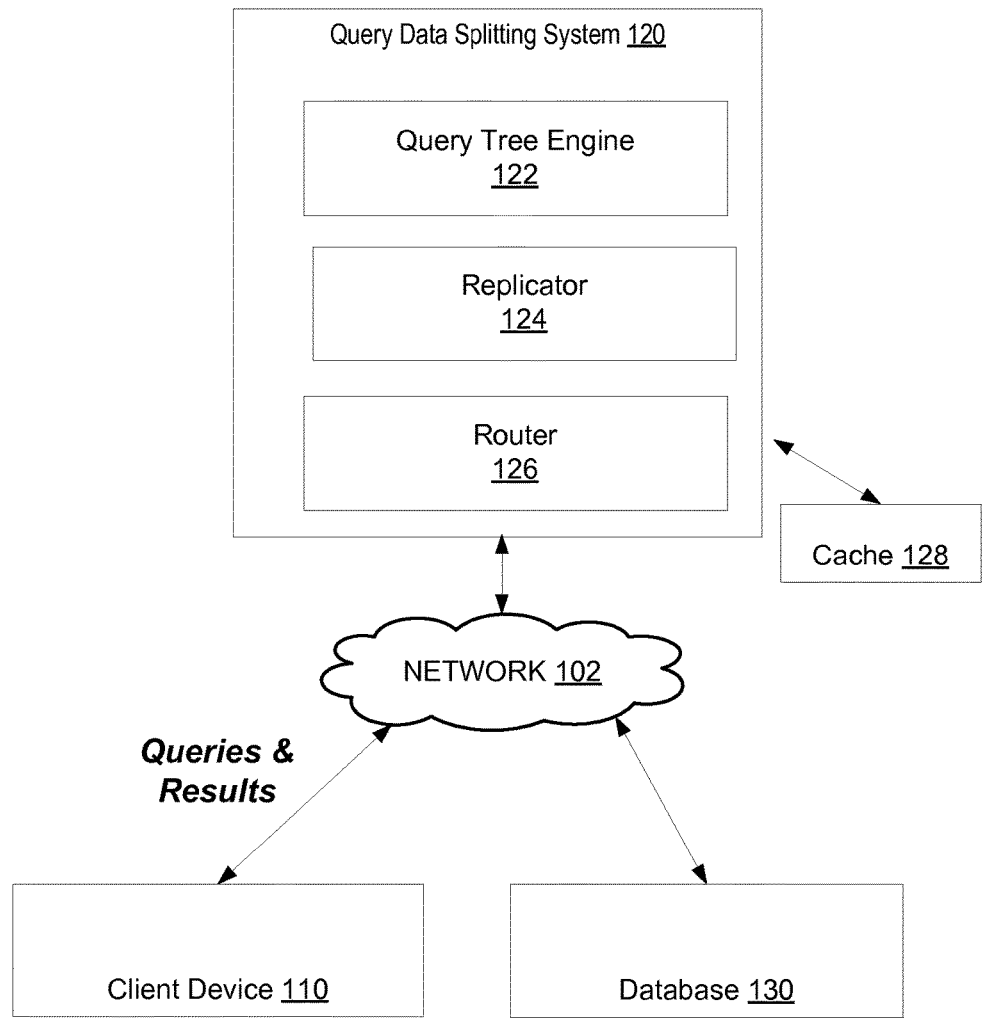
FIG. 1 depicts a block diagram of a network architecture in which implementations of the present disclosure can operate.

FIG. 1 depicts a block diagram of a network architecture 100 in which implementations of the present disclosure can operate. The network architecture 100 includes a query data splitting system 120 communicably coupled to a client device 110 and a database 130 via network 102. Network 102 may be a private network (e.g., a local area network (LAN), a wide area network (WAN), intranet, or other similar private networks) or a public network (e.g., the Internet). Query data splitting system 120 may include one or more machines such as server computers, desktop computers, or any other computing device.

The client device 110 may be personal computers (PC), laptops, mobile phones, tablet computers, or any other computing devices. The client device 110 may run an operating system (OS) that manages hardware and software of the client device 110. An application or a daemon (not shown) may run on the client device 110 (e.g., on the OS of each client device) to enable a user to submit a query and receive the results of the query.

Database 130 may be implemented on one or more machines, such as server computers, desktop computers, or any other computing device. An example of the database 130 is a persistent storage that is capable of storing data that is collected from various data sources including local and remote computing devices such as desktop computers, laptop computers, handheld computers, server computers, gateway computers, mobile communications devices, cell phones, smart phones, or similar computing device. In some embodiments, database 130 might be a network-attached file server, while in other embodiments administration database 130 might be some other type of persistent storage such as an object-oriented database, a relational database, and so forth. The database 130 may be part of the query data splitting system 120 or coupled to the query data splitting system 120 directly or via a network. In an example, the database 130 can be a relational database management system (RDBMS) used for the storage of information used for financial records, manufacturing and logistical information, personnel data, and the like. In an example, the database 130 can include data federation processing logic to enable a search for and retrieval of the query results.

The query data splitting system 120, of examples of the disclosure, can receive queries from the client device 110, analyze the queries, and determine how the queries relate to each other. For example, the query data splitting system 120 may oversee and manage the analysis of the queries and determine a specific query to send to the database 130 to obtain a result for the query. The query data splitting system 120 may be implemented on one or more machines, such as server computers, desktop computers, or any other computing device.

The query data splitting system 120 may include a cache 128, a query tree engine 122, a replicator 124, and a router 126. The query data splitting system 120 can receive queries from one or more client devices 110. The queries can be analyzed by the query tree engine 122 to determine the relationship between the queries and to determine which specific query to send to the database 130 to obtain query results via the router 126.

In another example, the query data splitting system 120 can determine whether to send a specific query to either the database 130 or to the cache 128 via the router 126. The cache 128 is random access memory that is located closely to the processing device in the computing system that implements the query data splitting system 120. In an example, the cache 128 is on the same chip as the processing device. The cache 128 enables the query data splitting system 120 to access the data stored in cache more quickly than it would to access the data stored in the database 130.

The replicator 124 is a component of the query data splitting system 120. The replicator 124 can receive a query result from the database 130 and replicate the result. The router 126 can route the replicated result to be stored in the cache 128 for quick access.

The query tree engine 122 can create a distinctive node for each unique query and determine whether the query is either the same as another query, a parent or superset of the other query, a child or a subset of the other query, or independent of the other query. Table 1 shows an example of 4 different queries and the relationships between the queries.

TABLE 1 sample queries

| ID | Query | Note |
|---|---|---|
| 1 | select * from BOOKS | The most general query |
| 2 | select * from BOOKS where published > 1999 | Only newer books |
| 3 | select * from BOOKS where published > 1999 AND and genre='sci-fi' | Subset of newer books (subset of data returned by query 2) |
| 4 | select * from BOOKS where published <= 1999 | Only a subset of query 1 |

As shown in Table 1, the first query (ID #1) is the most general query of the four queries. This query selects from all books. The second query (ID #2) selects newer books, in this example, the second query selects only books that are published later than 1999. As such, the second query is a subset of the first query, and the first query is a superset of the second query. This can also be referred to as the second query is a child of the first query or the first query is a parent of the second query.

The third query (ID #3) as illustrated in Table 1 selects only books that are published later than 1999 having a genre of science fiction or "sci-fi". Thus, the third query is a subset or a child of the second query.

The fourth query (ID #4) selects books that were published during or before 1999. Accordingly, the fourth query is a subset or child of the first query but is independent of the second and third queries. After the query tree engine 122 determines how the queries relate to each other, the query tree engine 122 can construct a query tree.

Figure 2:
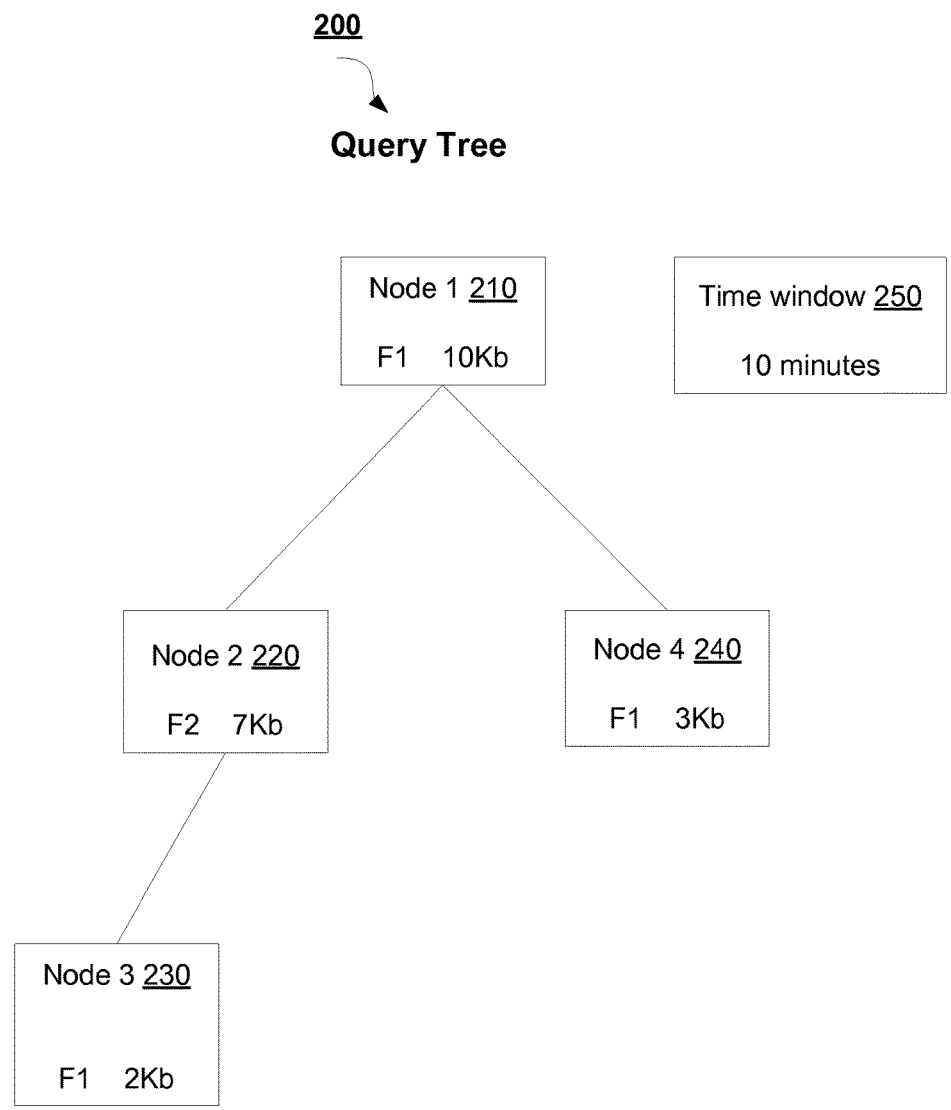
FIG. 2 illustrates an example of a query tree in accordance with some implementations of the present disclosure.

FIG. 2 illustrates an example of a query tree 200 in accordance with some implementations of the present disclosure. The relations between the queries can be described using a graph called a "query tree."

In the example query tree 200 as shown in FIG. 2, node 1 210 relates to the first query (ID #1) of Table 1, node 2 220 relates to the second query (ID #2), node 3 230 relates to the third query (ID #3), and node 4 240 relates to the fourth query (ID #4). The example query tree 200 illustrates that node 1 210 is a parent of node 2 220 and of node 4 240, while node 2 220 is a parent of node 3 230. The example query tree 200 also illustrates a time window 250, which is used to measure how many times each query is run or submitted within a certain window of time. The window can be any finite duration of time. In the example of query tree 200, the time window is 10 minutes. The time window can be configurable and variable and can be tuned based on admins experience and can also depend on the available size of the query result warehouse.

In this example, the query tree engine 122 can measure a frequency of a certain query within the time window 250. The frequency of a query is the number of times the query was received by the query tree engine 122 from one or more clients during the time window. In the example query tree 200, the frequency of node 1 210 (which relates to the first query or ID #1 of Table 1) within the 10 minute window of time window 250 is "1" as denoted by "F1". Stated differently, the first query was received one time within the 10 minute time window. Likewise, the frequency of node 2 220 is 2 as denoted by "F2", the frequency of node 3 230 is 1 as denoted by "F1", and the frequency of node 4 240 is 1 as denoted by "F1".

The fact that sample queries are being submitted repeatedly to the query data splitting system 120 is quite a natural process. For example, a query can be embedded in an enterprise information system and thus can be run repetitively.

The query tree 200 also includes an average size of the result set by the query represented by the node. For example, the result set from node 1 210 or the first query or ID #1 of Table 1 is 10 kilobytes in size, the result set from node 2 220 or the second query is an average of 7 kilobytes in size, the result set from node 3 230 or the third query is 2 kilobytes in size, and the result set from node 4 240 or the fourth query is 3 kilobytes in size.

In the example query tree 200, suppose the fourth query is received again by the query data splitting system 120 from a client device 110. The query data splitting system 120 can look into the cache 128 to see, whether the parent node of node 4 (node 1) has the query results stored. If the answer is yes, the query data splitting system 120 can run the query 4 on the stored results of query 1 from the cache 128.

In furtherance to this example, assume that the query results data for node 1 are not in the cache 128. In this case the query data splitting system 120 has multiple options. One option is that the query data splitting system 120 can run query 4 directly on the database 130. Another option is that the query data splitting system 120 can run query 1 on the database 130. The query data splitting system 120 can decide what is better. For example, if the query data splitting system 120 runs the query 1 on the database 130 and the result are stored into the cache 128, then the query data splitting system 120 can run successive query 4's on result stored from query 1 from the cache 128. The benefit of this approach is that the stored results of query 1 will also be available to query 2 and in turn to query 3.

The query data splitting system 120 can add a node that represents a new query to the query tree 200 and recompute the statistics in view of the newly added node. After the new node is added to the query tree 200, the query tree engine 122 can find the ancestors and children of the new query node.

Figure 3:
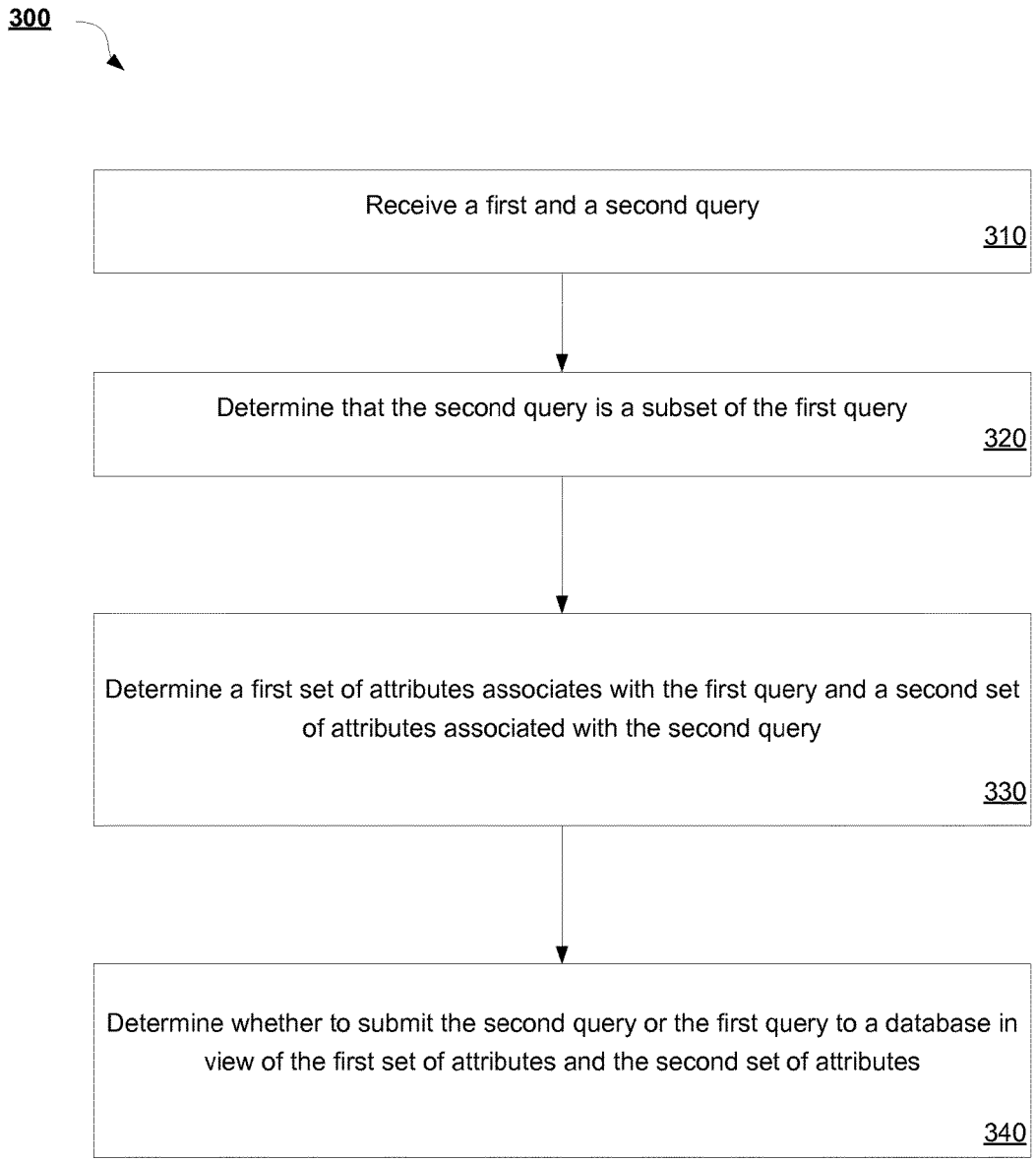
FIG. 3 shows a flow diagram illustrating an example of query data splitting in accordance with some implementations of the present disclosure.

FIG. 3 shows a flow diagram illustrating a method 300 for implementing query data splitting in accordance with some implementations of the present disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by the query data splitting system 120 described with respect to FIG. 1.

Method 300 begins at block 310, where the query data splitting system 120 receives a first and second query from, for example, a client device 110. Then, at block 320, the query data splitting system 120 can determine that the second query is a subset of the first query. In one example, the query data splitting system 120 can determine that the second query is a subset of the first query by finding matching nodes in a graph discussed above. If the graph does not include a matching node for at least one of the two queries, the query data splitting system 120 can evaluate both queries to determine whether the second query is a subset of the first query, and then add a node to the graph for each query that does not have a match in the graph. For example, the query data splitting system 120 can determine a first set of tables, a first set of columns, and a first set of conditions associated with the first query and a second set of tables, a second set of columns, and a second set of conditions associated with the second query. An example of the tables, columns and conditions is illustrated in Table 1 as discussed above.

From the tables, columns and conditions (e.g., see Table 1, above), the query data splitting system 120 can determine that the second query is a subset of the first query when the second set of tables is equal to or is a subset of the first set of tables, and when the second set of columns is equal to or is a subset of the first set of columns, and when each condition in the second set of conditions is included in the first set of conditions or when each condition in the second set of conditions is covered by the first set of conditions (e.g., if the first query requests to select all of the books and the second query requests to select some of the books that satisfy certain criteria).

Subsequently, at block 330, the query data splitting system 120 can determine a first set of attributes associated with the first query and a second set of attributes associated with the second query. In an example, the set of attributes includes a frequency of a number of instances of receiving a query within a predefined time window 250. In another example, the set of attributes includes a size of the query result.

Lastly, at block 340, the query data splitting system 120 can determine whether to submit the second query or the first query to the database 130 in view of the first set of attributes and the second set of attributes. For example, the query data splitting system 120 can determine to submit the second query to the database when a product of the second frequency and the size of the second query is less than a product of the first frequency and the size of the first query. In another example, the query data splitting system 120 can determine to submit the first query to the database when a product of the second frequency and the size of the second query is greater than or equal a product of the first frequency and the size of the first query.

In another example, after receiving the first and second queries and their respective sets of attributes, the query data splitting system 120 can receive a third query from a client device 110, can determine that the second query is a subset of the third query, can determine that a third set of attributes of the third query includes a third frequency of a number of instances of receiving the third query within a predefined time period and a size of the results of the third query, and can then determine whether to submit the first query, the second query, or the third query to the database 130 in view of the first, second, and third sets of attributes.

In the above example, the query data splitting system 120 can determine to submit the first query to the database 130 when a product of the second frequency and the second size is greater than or equal a product of the first frequency and the first size and when the product of the second frequency and the second size is less than a product of the third frequency and the third size.

To further illustrate the examples as discussed above, suppose the first query has a frequency of "1" within the time window 250 and the size or average size of the query results for query 1 is 10 kilobytes, and further suppose that the second query has a frequency of "2" within the time window 250 and the size or average size of the query results for query 2 is 7 kilobytes. In this case, the product of the attributes for node 1 is less than the product of the attributes for node 2 (10K vs. 14K), therefore, the query data splitting system 120 can determine to submit the first query to the database 130.

Figure 4:
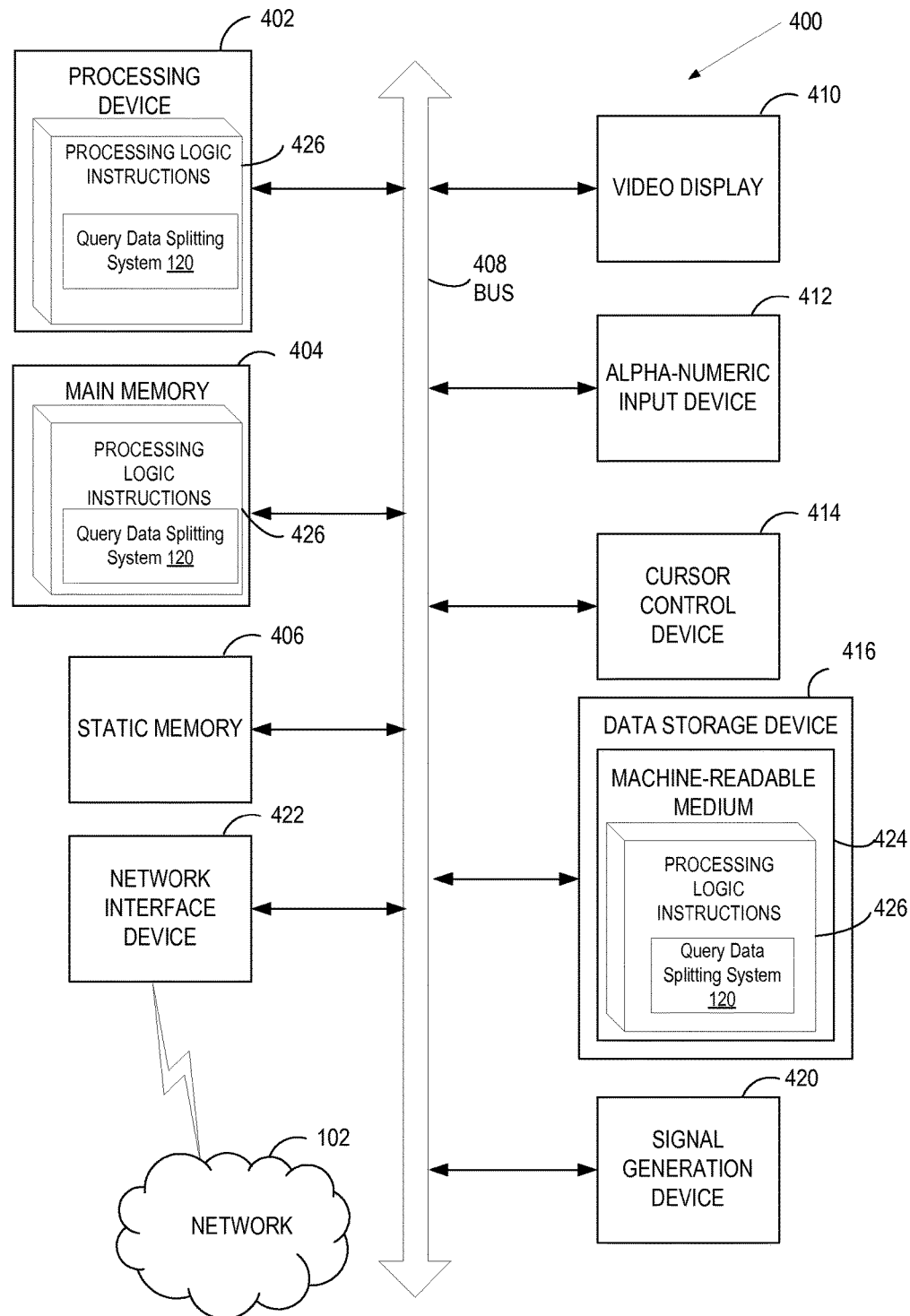
FIG. 4 shows a diagrammatic representation of a machine in the form of a computer system, in accordance with one example.

FIG. 4 depicts a diagrammatic representation of a machine in the form of a computer system 400 within which a set of memory instructions, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 400 includes a processing device 402 (e.g., a processor), a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a secondary memory 416 (e.g., a data storage device), which communicate with each other via a bus 408.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the operations for the query data splitting system 120 for performing steps discussed herein.

The computer system 400 may further include a network interface device 422. The network interface device may be in communication with a network 102. The computer system 400 also may include a video display unit 410 (e.g., a liquid crystal display (LCD), a touch screen, or a cathode ray tube (CRT)), an alphanumeric input device 412 (e.g., a keyboard), a cursor control device 414 (e.g., a mouse), and a signal generation device 420 (e.g., a speaker).

The secondary memory 416 may include a computer-readable storage medium (or more specifically a non-transitory computer-readable storage medium) 424 on which is stored one or more sets of instructions 426 (e.g., instructions executed by the query data splitting system 120) for the computer system 400 representing any one or more of the methodologies or functions described herein. The instructions 426 for the computer system 400 may also reside, completely or at least partially, within the main memory 404 and/or within the processing device 402 during execution thereof by the computer system 400, the main memory 404 and the processing device 402 also constituting computer-readable storage media. The instructions 426 for the computer system 400 may further be transmitted or received over a network via the network interface device 422.

While the computer-readable storage medium 424 is shown in an example to be a single medium, the term "computer-readable storage medium" should be taken to include a single medium or multiple media (e.g., a centralized or distributed database, and/or associated caches and servers) that store the one or more sets of instructions 426. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:

receiving, by a processing device, a first query and a second query;

determining that the second query is a subset of the first query based on a query tree, wherein the query tree comprises nodes representing queries received by the processing device and relationships between the queries, wherein the query tree comprises statistics from execution of the queries, wherein the first query is to select data from a first set of columns from a first set of tables of a relational database management system (RDBMS), and wherein the second query is to select data from at least a subset of the first set of columns from at least a subset of the first set of tables of the RDBMS;

determining a first set of conditions associated with the first query and a second set of conditions associated with the second query;

determining that the second query is a subset of the first query when the second set of tables is equal to or is a subset of the first set of tables, and when the second set of columns is equal to or is a subset of the first set of columns, and when each condition in the second set of conditions is included in the first set of conditions;

determining, by the processing device, whether a cache stores a copy of first results from the first query;

in response to the cache storing the copy of the first results from the first query, running the second query on the copy of the first results stored in the cache;

in response to the cache not storing the copy of the first results from the first query:

determining first statistics associated with the first query and second statistics associated with the second query, wherein the first statistics is based on a first frequency and first size of the first result from the first query, and the second statistic is based on a second frequency and second size of a second result from the second query;

comparing the first statistics with the second statistics to determine one or more operations for obtaining the second result of the second query;

in response the first statistics exceeding the second statistics, determining that the one or more operations for obtaining the second result of the second query include submitting the second query to the RDBMS over the network; and in response to the second statistics exceeding the first statistics, determining that the one or more operations for obtaining the second result of the second query include submitting the first query to the RDBMS over the network, storing the copy of the first results from the first query in the cache, and running the second query on the copy of the first results stored in the cache.

2. The method of claim 1, wherein the second statistics is a product of the second frequency and the second size, and the first statistics is a product of the first frequency and the first size.

3. The method of claim 2, further comprising determining, by the processing device, to submit the first query to the database over the network when a product of the second frequency and the second size is greater than or equal a product of the first frequency and the first size.

4. The method of claim 1, further comprising:
receiving a third query;
determining that the second query is a subset of the third query;
determining third statistics associated with third query comprising a third frequency of a number of instances of receiving the third query within the defined time period and a third size of a result of the third query; and
determining whether to submit the first query, the second query, or the third query to the database over the network in view of the first statistics, the second statistics, and the third statistics.

5. The method of claim 4, further comprising
determining to submit the first query to the database over the network when a product of the second frequency and the size of the second query is greater than or equal a product of the first frequency and the size of the first query and when the product of the second frequency and the size of the second query is less than a product of the third frequency and the third size.

6. An apparatus comprising:
a memory; and
a processing device operatively coupled to the memory, the processing device to:
receive a first query and a second query;
determine that the second query is a subset of the first query based on a query tree, wherein the query tree comprises nodes representing queries received by the processing device and relationships between the queries, wherein the query tree comprises statistics from execution of the queries, wherein the first query is to select data from a first set of columns from a first set of tables of a relational database management system (RDBMS), and wherein the second query is to select data from at least a subset of the first set of columns from at least a subset of the first set of tables of the RDBMS;
determine a first set of conditions associated with the first query and a second set of conditions associated with the second query;
determine that the second query is a subset of the first query when the second set of tables is equal to or is a subset of the first set of tables, and when the second set of columns is equal to or is a subset of the first set of columns, and when each condition in the second set of conditions is included in the first set of conditions;
determine whether a cache in the memory stores a copy of first results from the first query;
run the second query on the copy of the first results stored in the cache in response to the cache storing the copy of the first results from the first query;
in response to the cache not storing the copy of the first results from the first query:
determine first statistics associated with the first query and second statistics associated with the second query, wherein the first statistics is based on a first frequency and first size of the first result from the first query, and the second statistic is based on a second frequency and second size of a second result from the second query;
compare the first statistics with the second statistics to determine one or more operations for obtaining the second result of the second query;
in response the first statistics exceeding the second statistics, determine that the one or more operations for obtaining the second result of the second query include submitting the second query to the RDBMS over the network; and
in response to the second statistics exceeding the first statistics, determine that the one or more operations for obtaining the second result of the second query include submitting the first query to the RDBMS over the network, store the copy of the first results from the first query in the cache, and run the second query on the copy of the first results stored in the cache.

7. The apparatus of claim 6, wherein the processing device is further to determine the second statistics as a product of the second frequency and the second size, and the first statistics as a product of the first frequency and the first size.

8. The apparatus of claim 7, wherein the processing device is further to determine to submit the first query to the database over the network when a product of the second frequency and the second size is greater than or equal a product of the first frequency and the first size.

9. The apparatus of claim 6, wherein the processing device is further to:
receive a third query,
determine that the second query is a subset of the third query,
determine third statistics associated with the third query comprising a third frequency of a number of instances of receiving the third query within the defined time period and a third size of a result of the third query, and
determine whether to submit the first query, the second query, or the third query to the database over the network in view of the first statistics, the second statistics, and the third statistics.

10. A non-transitory computer readable storage medium including instructions that, when executed by a processing device, cause the processing device to:
receive a first query and a second query;
determine that the second query is a subset of the first query based on a query tree, wherein the query tree comprises nodes representing queries received by the processing device and relationships between the queries, wherein the query tree comprises statistics from execution of the queries, wherein the first query is to select data from a first set of columns from a first set of tables of a relational database management system (RDBMS), and wherein the second query is to select data from at least a subset of the first set of columns from at least a subset of the first set of tables of the RDBMS;
determine a first set of conditions associated with the first query and a second set of conditions associated with the second query;
determine that the second query is a subset of the first query when the second set of tables is equal to or is a subset of the first set of tables, and when the second set of columns is equal to or is a subset of the first set of columns, and when each condition in the second set of conditions is included in the first set of conditions;

determine whether a cache stores a copy of first results from the first query;

in response to the cache storing the copy of the first results from the first query, run the second query on the copy of the first results stored in the cache;

in response the cache not storing the copy of the first results from the first query:

determine first statistics associated with the first query and second statistics associated with the second query, wherein the first statistics is based on a first frequency and first size of the first result from the first query, and the second statistic is based on a second frequency and second size of a second result from the second query;

compare the first statistics with the second statistics to determine one or more operations for obtaining the second result of the second query with efficient use of resources;

in response the first statistics exceeding the second statistics, determine that the one or more operations for obtaining the second result of the second query with efficient use of resources include submitting the second query to the RDBMS over the network without submitting the first query to the RDBMS over the network; and in response to the second statistics exceeding the first statistics, determine that the one or more operations for obtaining the second result of the second query with efficient use of resources include submitting the first query to the RDBMS over the network, store the copy of the first results from the first query in the cache, and run the second query on the copy of the first results stored in the cache.

11. The non-transitory computer readable storage medium of claim 10, further comprising instructions to determine the second statistics as product of the second frequency and the second size, and the first statistics as a product of the first frequency and the first size.

12. The non-transitory computer readable storage medium of claim 11, further comprising instructions that, when executed by the processing device, cause the processing device to determine to submit the first query to the database over the network when a product of the second frequency and the second size is greater than or equal a product of the first frequency and the first size.

13. The non-transitory computer readable storage medium of claim 10, further comprising instructions that, when executed by the processing device, cause the processing device to:

receive a third query;

determine that the second query is a subset of the third query;

determine third statistics associated with the third query comprising a third frequency of a number of instances of receiving the third query within the defined time period and a third size of a result of the third query; and determine whether to submit the first query, the second query, or the third query to the database over the network in view of the first statistics, the second statistics, and the third statistics.

14. The method of claim 1, wherein the first frequency is a number of instances of receiving the first query within a defined time period and the second frequency is a number of instances of receiving the second query within the defined time period.

15. The apparatus of claim 6, wherein the processing device is to determine the first frequency as a number of instances of receiving the first query within a defined time period and the second frequency as a number of instances of receiving the second query within the defined time period.

16. The non-transitory computer readable storage medium of claim 10, further comprising instructions that, when executed by the processing device, cause the processing device to:

determine the first frequency as a number of instances of receiving the first query within a defined time period and the second frequency as a number of instances of receiving the second query within the defined time period.

* * * * *